April 14, 1970   J. J. WENSKUS   3,506,212
REEL WITH ATTACHED FILM RETAINING MEANS
Original Filed Nov. 24, 1967   2 Sheets-Sheet 1

JAMES J. WENSKUS
*INVENTOR.*

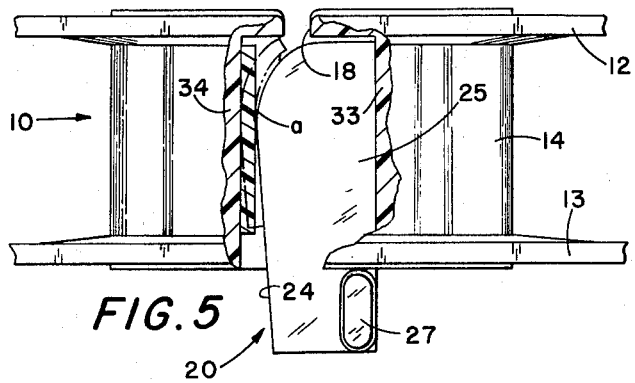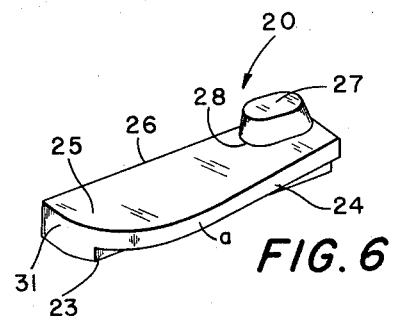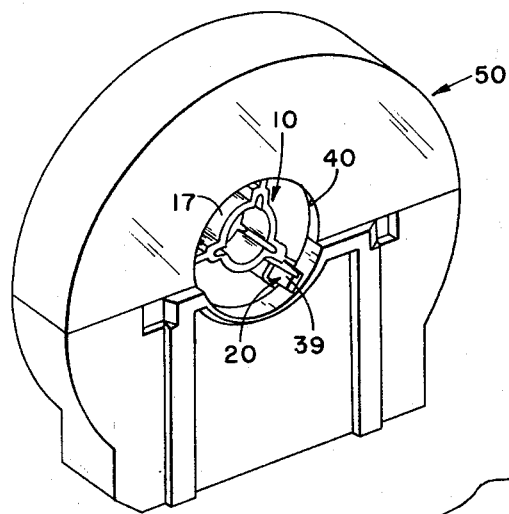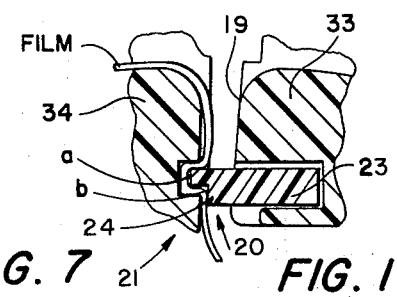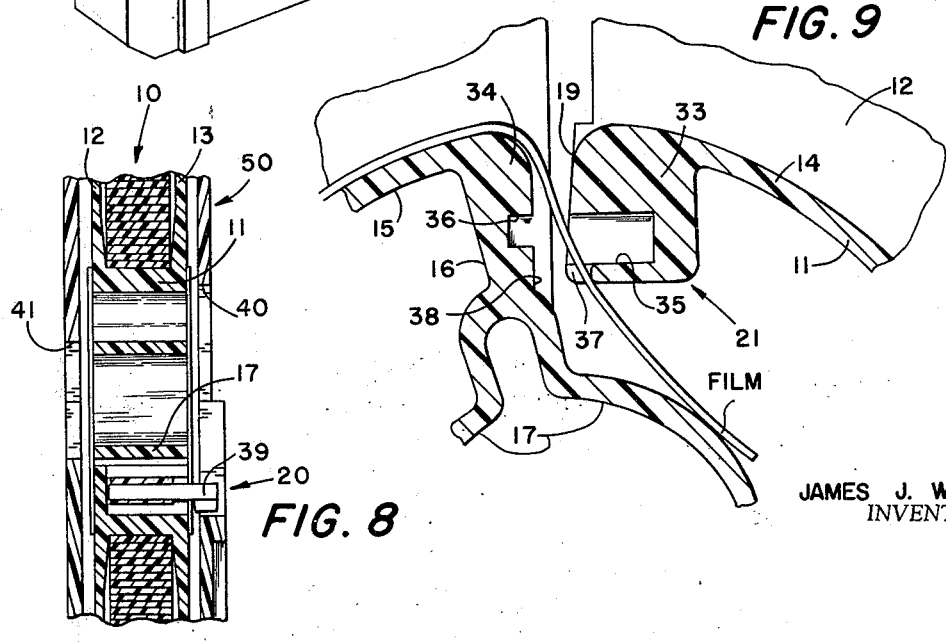
JAMES J. WENSKUS
INVENTOR.

United States Patent Office 3,506,212
Patented Apr. 14, 1970

3,506,212
REEL WITH ATTACHED FILM RETAINING MEANS
James J. Wenskus, Rochester, N.Y., assignor to Eastman Kodak Company, Rochester, N.Y., a corporation of New Jersey
Continuation of application Ser. No. 685,615, Nov. 24, 1967. This application Feb. 14, 1969, Ser. No. 805,094
Int. Cl. B65h 75/28
U.S. Cl. 242—74.1
6 Claims

ABSTRACT OF THE DISCLOSURE

An improved pin and socket assembly for releasably securing an elongated web or film to a supply reel or other structure. The pin is especially shaped for optimum retaining characteristics, and may have an extended head portion to prevent improper positioning of the reel in a reel cartridge or other container.

This application is a continuation of application Ser. No. 685,615, filed Nov. 24, 1967, now abandoned.

CROSS-REFERENCES TO RELATED APPLICATIONS

Reference is made to commonly assigned U.S. application Ser. No. 685,589, now Patent No. 3,463,411 entitled Reel and Web Retaining Means Therefor, filed in the name of Morris E. Brown on Nov. 24, 1967; and commonly assigned U.S. application Ser. No. 685,597, entitled Cartridge and Reel Alignment Means, filed in the name of Arthur H. Crapsey on Nov. 24, 1967; and commonly assigned U.S. application Ser. No. 685,631, now Patent No. 3,465,980 entitled Reel and Film Retaining Means, filed in the name of Evan A. Edwards et al. on Nov. 24, 1967.

BACKGROUND OF THE INVENTION

The present invention relates to a means for releasably securing the end of an elongated web to a reel, and to means for assuring proper orientation of a reel when it is placed in a cartridge or other compartment.

While applicable to different types of apparatus, the present invention has particular utility in the field of motion picture projectors, and specifically to cartridge-loaded projectors which automatically rewind the film at the end of the projection cycle. In such projectors, the film supply reel is received in a cartridge removably mounted on a projector. A stripper mechanism, incorporated into the projector, strips the leading film end from the supply reel and directs the same into an automatic threading mechanism which threads the film to a projection gate. One end of the film is anchored to the supply reel and a rewind cycle is activated automatically in response to a pronounced increase in film tension, as will occur when the projection feeding mechanism attempts to pull the anchored end of the film from the reel.

A retaining means for securing the end of a film to a supply reel and for insuring proper orientation of a reel within a cartridge is disclosed in commonly assigned copending U.S. application Ser. No. 685,589, entitled Reel and Web Retaining Means Therefor, filed in the name of Morris E. Brown on Nov. 24, 1967 and in commonly assigned copending U.S. application Ser. No. 685,597, entitled Cartridge and Reel Alignment Means, filed in the name of Arthur H. Crapsey on Nov. 24, 1967. The present invention constitutes an improvement over the retaining and orienting means disclosed in said copending applications.

While the film retaining means and reel orientating means disclosed in the aforementioned applications serve the intended purposes, they have certain disadvantages. For example, the pin disclosed may not remain locked in its retaining position if the film should by chance become set or deformed as a result of long term storage. Moreover, the sheer forces set up in the film by the disclosed retaining means tend to initiate tears which begin at the edge portions of the film and progress inwardly until the film is severed. In addition, formation of the pin disclosed in said application requires a separate molding or forming step, which increases the cost of the reel and pin combination.

SUMMARY OF THE INVENTION

An object of the present invention, is to provide a film retaining means, all parts of which may be molded in a single operation with the reel itself.

Another object is to provide a film retaining pin which will remain attached to a reel until use.

A still further object is to provide a retaining pin which will remain in its socket even after the film has become set or permanently deformed in its retained position.

In a disclosed embodiment of the invention a film reel is provided with a socket arranged to have a film threaded therethrough. A pin which may be initially molded as an integral part of the reel structure may be inserted into the socket to frictionally engage and retain the film therein. A film engaging edge of the pin is curved to engage the center portion of a web or film more securely than the edge portions thereof. This pin shape reduces the chance of film tear and the chance that the pin will become displaced from the socket if the film should deform or take a set.

Other objects and advantages will become apparent from the following description of an illustrative preferred embodiment of the invention.

BRIEF DESCRIPTION OF DRAWINGS

In the drawings:
FIG. 5 is a fragmentary side view of the reel in partial section to show the film secured by the retaining pin and the manner in which the pin is retained in its socket after the film has taken a set about the pin;
FIGS. 6 and 6A are enlarged perspective views of the film retaining pin;
FIG. 7 is a perspective view of the reel positioned in a cartridge;
FIG. 8 is a fragmentary side view in section showing the relative sizes of the central openings in the cartridge, and the orienting function of the retaining pin;
FIG. 9 is an enlarged fragmentary sectional view of the retaining pin socket showing the film inserted therein;
and
FIG. 10 is an enlarged fragmentary sectional view of the retaining pin socket showing the retaining pin inserted therein.

DETAILED DESCRIPTION OF PREFERRED EMBODIMENTS

Figure 4:
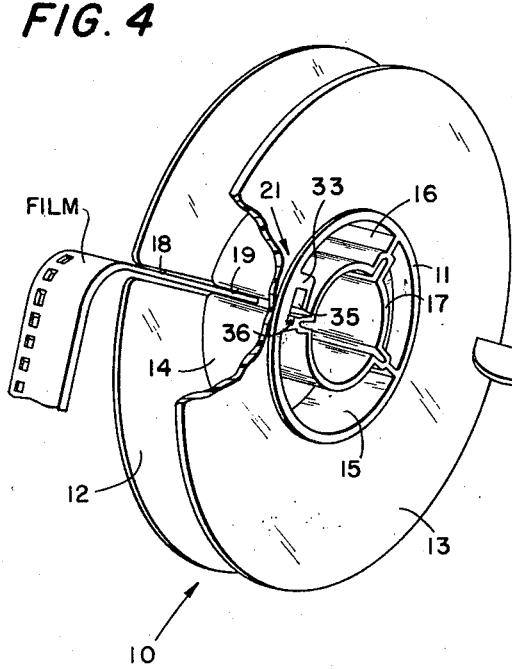
FIG. 4 is a perspective view of the reel with a portion thereof broken away, showing the manner in which the film end is threaded into the film retaining means.

Referring to the drawings, a supply reel 10 is disclosed, comprising a hub 11 and front and back sideflanges 12 and 13, respectively, extending radially outwardly from the periphery of hub 11 and spaced along the hub axis by a distance slightly greater than the width of film or other elongated material to be received on the reel 10. The hub has a peripheral wall defining an outer annular surface 14 (FIG. 4) for supporting the film convolutions and an inner surface 15 from which arms 16 extend radially inward to a central core 17 having a central opening for receiving the spindle of a movie projector (not shown). Side-flange 12 of the reel 10 has a radial break 18 therein to facilitate insertion of film in a film threading opening 19 in the peripheral wall of hub 11.

Figure 3:
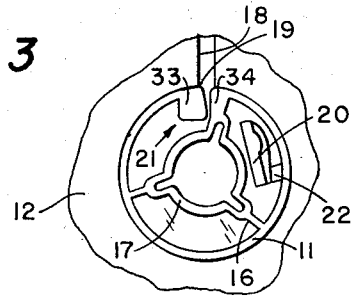
FIG. 3 is a front view of the hub portion of the reel shown in FIG. 1.
Figure 2:
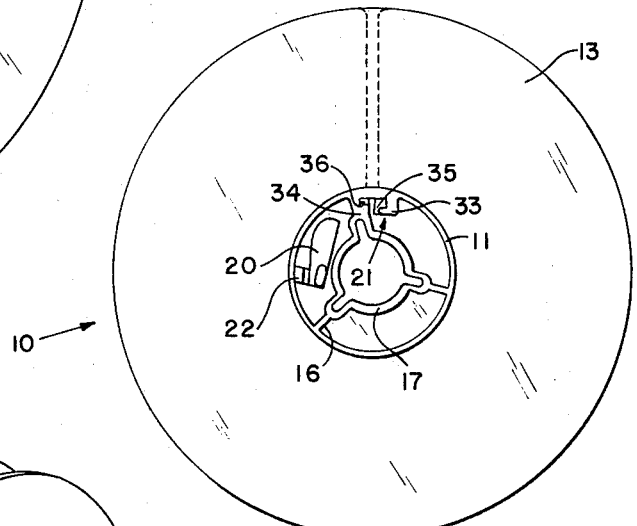
FIG. 2 is a rear elevational view of the reel shown in FIG. 1.
Figure 6A:
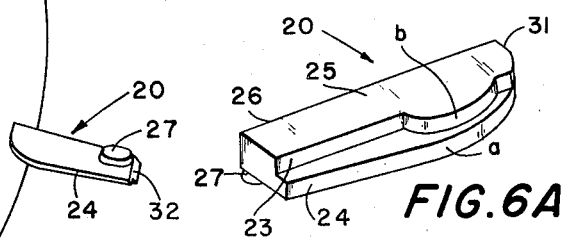

In FIGURES 2 and 3, one embodiment of a film retaining means in accordance with the invention is disclosed. This means comprises a film retaining pin 20 and a pin receiving socket 21 which are molded or formed as an integral part of reel 10 on inner surface 15 and hub 11. As one feature of the embodiment disclosed, pin 20 and socket 21 are molded in one operation and as one piece with the supply reel 10, such that pin 20 is attached to reel 10 at an otherwise unused portion of the reel hub 11 by a thin connecting web 22. Socket 21, on the other hand, is located near and is formed by part of a radial arm 16 in such a manner that it will receive added support and rigidity therefrom. However, as would be obvious to one skilled in the art, other features of the invention are not dependent on such integral molding and the pin and socket can be separately formed if desired to achieve such other features The particular shape of retaining pin 20 is most clearly shown in FIGS. 6 and 6A. More specifically, the pin 20 has an asymmetrical cross section defining a relatively thick elongated portion 23 having a narrower film engaging edge portion 24 projecting therefrom along the length thereof and defining a convexly curved film engaging edge surface (a). The pin also defines a flat recessed surface along the portion 23 which defines a small convexly curved film engaging surface (b) aligned with the surface (a).

The pin 20 further defines flat sides 25 and a flat edge portion 26 for properly aligning the pin 20 in the socket 21. On one flat side 25 of pin 20 is located a stop member 27 having a forward end 28, the function of which will be described more fully hereinafter.

The leading or bight portions of the surfaces (a) and (b) of pin 20 are located substantially halfway between the forward end 28 of stop member 27 and the tip end 31 of pin 20, and the distance between the forward end 28 of the stop member 27 and the tip end 31 of the pin is approximately equal to the axial length of hub 11. With this arrangement, the surfaces (a) and (b) exert maximum pressure on the central portion of the film as will later be described in more detail.

Figure 1:
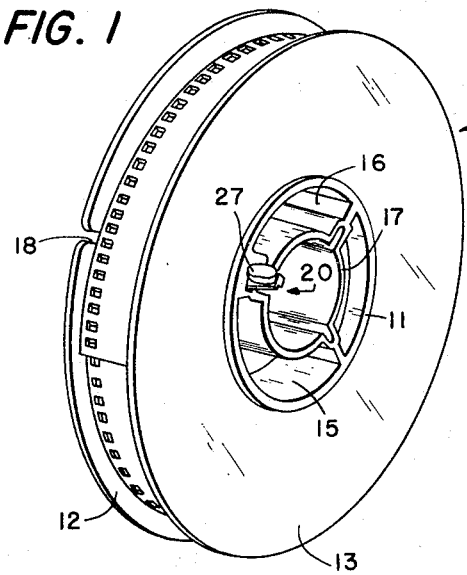
FIG. 1 is a perspective view of a supply reel having a film retaining means in accordance with the invention.

Referring again to FIGS. 1, 2, and 9, socket 21 comprises a protuberance 33 extending along the inner surface 15 of hub 11 and a portion 34 of one of the radial arms 16. The protuberance 33 and portion 34 extend along the axial length of the hub 11 and are located on opposite sides of and define an extension of the retaining slot 19, but are close enough together to produce a light frictional retaining effect on a film threaded therethrough in the manner indicated in FIG. 9.

For receiving portion 23 of pin 20, protuberance 33 defines a slot 35 along substantially the entire axial length of the hub. The portion 34 of radial arm 16, on the other hand, contains a similar but narrower slot 36 for receiving the portion 24 of the pin 20. It will be apparent that the arrangement of slots 35 and 36 is such that the pin can be inserted into socket 21 only when the portions 23 and 24 are aligned with slots 35 and 36.

Referring in detail to FIG. 9, the socket 21 defines an abutment or film alignment means comprising lips 37 and 38 on the side from which the film is inserted. More specifically, the lip 37 is defined by the protuberance 33 on one side of the slot 19 at the lower end thereof while the lip 38 is defined by the portion 34 on the same side of the slot 19 as the portion 34 along the length thereof as viewed in FIG. 9. Because of the tendency of the film to remain substantially straight, and the position of the core 17, which urges the film to one side (the right as viewed in FIG. 9), the edge of the film will engage the edges of lips 37 and 38. This will effectively trap the film such that it will not be pushed out of the core when the retaining pin is inserted from the opposite side.

In operation of the retaining means, a strip of film is inserted into retaining slot 19 and between protuberance 33 and portion 34 of socket 21 as shown in FIG. 9. After the film is wound onto the reel, for example in the film processing laboratory or on a projector, pin 20 is inserted into socket 21, until stop member 27 abuts against the edge of protuberance 33, thereby locking the film to the reel. As the pin 20 in inserted into socket 21 the projecting edge portion 24 forces a portion of the film into the slot and bends it into a bulged U-shaped configuration within the slot 36 as shown in FIG. 10. The U-shaped portion of the film thus formed in the slot 36 will selectively engage the side and bottom wall surfaces of the slot 36, the edges of the surface (a) and the side surfaces of the edge portion 24, depending on the radii of the film bends thus formed. In addition the curved surface (b) of the pin 20 will engage and force the portion of the film immediately below the slot 36 (as viewed in FIG. 10) against the surface of portion 34 of arm 16 to thus establish frictional retention of said film portion. The frictional retaining force thus established by surface (b) and the adjacent surface of portion 34 tends to supplement the effective frictional retaining force established by portion 24 and slot 36. When the film is subjected to a pulling force tending to remove it from the socket 21, the frictional retaining force established by surface (b) adds to the frictional resistance established by surface (a) and the surfaces of slot 36.

Since, as previously described, the bight portions of the surfaces (a) and (b) are halfway between forward end 28 of stop 27 and end 31 of pin 20, frictional retaining pressure between said surfaces and the film will be greatest at the center portion of the film. This not only reduces the chance of film tear, but also acts to retain the pin 20 in operative position even after the film has relaxed or taken a set about the pin, as shown in phantom in FIG. 5 where the film is depicted as it might appear after it has deformed about the curved edge of the pin.

Stop member 27 also serves to prevent the entire pin length from being inserted into socket 21, such that an extended portion 39 (FIGS. 7 and 8) of the pin may be used to insure proper orientation of the supply reel when it is placed in a reel cartridge 50 or other compartment adapted to permit rotation of the reel relative thereto. As shown in FIGS. 7 and 8, such a cartridge has opening 40 and 41 for receiving a reel spindle of a motion picture projector. Opening 40 is shown as having a greater radius than the distance between extended portion 39 of pin 20 and the center of revolution of reel 10. Thus, when the reel is properly inserted into the cartridge, as shown on FIG. 7, pin 20 will extend through opening 40 and the reel will rotate freely. On the other hand, opening 41 has a smaller radius than opening 40. If it is attempted to insert the reel into the cartridge 50 improperly, interference between the pin and the edges of opening 41 will result.

In the particular embodiment disclosed, extended portion 39 of pin 20 projects from the back side of the reel 10 and cartridge 50. This orientation is preferable since there is usually more wall thickness on the back side of the cartridge, and the extended portion will not project beyond the wall surface of the cartridge. Moreover, since the film perforations are on the opposite side, the pin is inserted against the side of the film which will take the most abuse. However, it will be obvious to those skilled in the art, that the pin could be inserted from either side of the reel, and that the extending portion 39 could extend from either side of the reel.

It should also be obvious to those skilled in the art that the disclosed retaining means could be used in tape recorders, computers and other devices where it is desired to secure a strip of material to a reel, or to some other structure.

The invention has been described in detail with particular reference to preferred embodiments thereof, but it will be understood that variations and modifications can be effected within the spirit and scope of the invention as described hereinabove and as defined in the appended claims.

I claim:
1. A reel for receiving an elongated web, comprising:
   a hub having an outer surface for supporting a web wound thereon;
   a socket on said hub having a slot therethrough for receiving an end portion of the web; and
   a pin for insertion into said socket to engage and releasably retain the end portion of the web in said socket, said pin being integrally formed on said reel and frangible therefrom for use in said socket.
2. A reel for receiving an elongated web, comprising:
   a hub having an outer web supporting surface;
   a socket located in said hub;
   means defining a slot extending inwardly from said surface to said socket for receiving an end portion of the web;
   a retaining pin having a shape suitable for insertion into said socket to engage and retain the web in said socket;
   a connecting member supporting said pin on said reel, said connecting member being frangible to permit said pin to be released from said reel for use with said socket to retain the web; and
   said pin, said connecting element and said reel comprising an integrally molded part.
3. A reel for receiving an elongated web, comprising:
   a hub having a surface for supporting a web wound thereon, and having means for receiving an end portion of the web; and
   a break-away member integral with said hub and insertable into said hub to engage and frictionally retain the web end portion to said hub.
4. A reel for receiving an elongated web, comprising:
   a hub having an outer peripheral wall defining an outer surface for supporting a web wound thereon, and having an inner core defining an opening for receiving a spindle, said hub defining a recess between the peripheral wall and the core;
   a socket in said hub;
   means defining a slot extending inwardly from the web supporting surface to said socket for receiving an end portion of the web;
   a retaining pin for insertion into said socket to engage and releasably retain the end portion of the web in said socket, said pin being integrally formed on said hub within the recess defined thereby, said pin being separable from said hub for use in said socket.
5. A reel for receiving an elongated web, comprising:
   a hub having a peripheral wall defining an outer surface for supporting a web wound thereon and an inner surface;
   a socket located in said hub;
   means defining a slot extending through said peripheral wall to said socket for receiving an end portion of the web;
   a retaining pin for insertion into said socket to engage and releasably retain the end portion of the web in said socket, said pin being integraly formed on the inner surface of said hub and separable therefrom for use in said socket.
6. An article of manufacture, comprising:
   a film reel adapted to have film wound thereon; and
   film retaining means for securing the end portion of a filmstrip to the reel, said film retaining means comprising a socket on said reel and a pin insertable into said socket to frictionally engage the film, said pin being integrally molded on said reel and separable therefrom for insertion in said socket.

References Cited

UNITED STATES PATENTS

| | | | |
|---|---|---|---|
| 3,062,468 | 11/1962 | Braun | 242—74 |
| 3,220,665 | 11/1965 | Modrey | 242—74.1 |
| 3,312,413 | 4/1967 | Bernstein | 242—74.2 |
| 3,326,483 | 6/1967 | Ivans | 242—74 X |

NATHAN L. MINTZ, Primary Examiner